United States Patent [19]

Christe et al.

[11] 4,152,406

[45] May 1, 1979

[54] SELF-CLINKERING $NF_4^+$ COMPOSITIONS FOR $NF_3$-$F_2$ GAS GENERATORS AND METHOD OF PRODUCING SAME

[75] Inventors: Karl O. Christe, Calabasas; Carl J. Schack, Chatsworth; Richard D. Wilson, Canoga Park, all of Calif.

[73] Assignee: Rockwell International Corporation, El Segundo, Calif.

[21] Appl. No.: 734,153

[22] Filed: Oct. 20, 1976

[51] Int. Cl.$^2$ .................. C01G 21/52; C01G 23/02
[52] U.S. Cl. .................. 423/351; 149/119; 149/109.4; 423/472
[58] Field of Search .................. 149/119, 19.3, 109.4; 423/351, 472

[56] References Cited

PUBLICATIONS

Christe et al., "Inorganic Halogen Oxidizer Research," abstract, Report R-9262 (publ. 1974).
Bailor et al., "Comprehensive Inorganic Chemistry," vol. 3, pp. 1330-1333 and 1370, Pergamen Press Ltd. (1973) Oxford.

*Primary Examiner*—Edward A. Miller
*Attorney, Agent, or Firm*—L. Lee Humphries; Robert M. Sperry

[57] ABSTRACT

Improved $NF_4^+$ compositions for solid propellant $NF_3$-$F_2$ gas generators are described which produce $NF_3$ and $F_2$ free of gaseous Lewis acids and do not require clinker forming additives for their complexing. The novel self-clinkering compositions $(NF_4)_2SnF_6$, $NF_4SnF_5$, $(NF_4)_2TiF_6$, $NF_4Ti_2F_9$, $NF_4Ti_3F_{13}$, and $NF_4Ti_6F_{25}$ and processes for their production are disclosed.

8 Claims, No Drawings

SELF-CLINKERING NF$_4^+$ COMPOSITIONS FOR NF$_3$-F$_2$ GAS GENERATORS AND METHOD OF PRODUCING SAME

The invention herein described was made in the course of or under a contract or subcontract thereunder, (or grant) with the United States Navy.

BACKGROUND OF THE INVENTION

1. Field of the Invention

This invention relates to compositions of matter and methods of producing the same and is particularly directed to improved solid propellant NF$_3$-F$_2$ gas generators derived from self-clinkering NF$_4^+$ salts, together with methods for producing such gas generators.

2. Description of the Prior Art

NF$_4^+$ salts are the key ingredients for solid propellant NF$_3$-F$_2$ gas generators, as shown by D. Pilipovich in U.S. Pat. No. 3,963,542. These propellants consist of a highly over-oxidized grain using NF$_4^+$ salts as the oxidizer. Burning these propellants with a small amount of fuel, such as aluminum powder, generates sufficient heat to thermally dissociate the bulk of the oxidizer. This is shown for NF$_4$BF$_4$ in the following equation:

$$NF_4BF_4 \rightarrow NF_3 + F_2 + BF_3$$

As can be seen from the equation the gaseous combustion products contain the volatile Lewis acid BF$_3$. This disadvantage of a volatile Lewis acid byproduct is shared by all the previously known NF$_4^+$ compositions. These volatile Lewis acids possess a relatively high molecular weight and a low $\gamma$ value ($\gamma = C_{pj}$), relative to

the preferred diluent helium and frequently act as a deactivator for the chemical HF-DF laser. Consequently, these volatile Lewis acids must be removed from the generated gas prior to its use in an efficient chemical laser. Based on the state of the art, heretofore, this would be achieved by adding a clinker forming agent, such as KF, to the solid propellant formulation. The function of this additive served to convert the volatile Lewis acid, such as BF$_3$, to a non-volatile salt as shown by the following equation:

$$KF + BF_3 \rightarrow KBF_4$$

The principal disadvantges of this approach are that, even if an excess of KF is used, complete clinkering cannot always be guaranteed, and that the addition of the KF severly degrades the yield of NF$_3$-F$_2$ obtainable per pound of formulation. This problem could be solved by using NF$_4^+$ containing compositions derived from non-volatile Lewis acids. However, the synthesis of such compositions has previously been unknown, since highly stable and non-volatile Lewis acids are polymeric and contain coordination-wise saturated central atoms. Consequently, these compounds possess very little or no acidity, which renders the synthesis of such salts very difficult.

BRIEF SUMMARY AND OBJECTS OF THE INVENTION

The above described problem of obtaining a Lewis acid free NF$_3$-F$_2$ gas stream from NF$_4^+$ compositions without clinker forming additives is overcome by the present invention. We have found that NF$_4^+$ salts, derived from the polymeric non-volatile Lewis acids SnF$_4$ (subliming at 704° C.) and TiF$_4$ (1 atm vapor pressure at 284° C.) can be prepared. The lack of acidity of SnF$_4$ at temperatures, at which NF$_4^{30}$ salts can be formed and exist, was demonstrated. It was shown that mixtures of NF$_3$, F$_2$, and SnF$_4$, when heated to temperatures of up to 300° C. at autogenous pressures of about 150 atm, did not show any eevidence for NF$_4^+$ formation.

Since a direct synthesis of an NF$_4^+$ salt derived from SnF$_4$ was not possible, we have studied metathetical and displacement reactions. Because SnF$_6^{--}$ salts are stable in anhydrous HF, the metathetical and displacement reactions were carried out in this solvent. The following methathetical reaction

was carried out. It resulted in the precipitation of the rather insoluble salt CsSbF$_6$, while the soluble (NF$_4$)$_2$SnF$_6$ remained in solution. The two products were separated by a simple filtration step. The composition (in mol%) of the crude product was: (NF$_4$)$_2$SnF$_6$, 83; NF$_4$SbF$_6$, 13; CsSbF$_6$, 4. The purity of this product can be easily increased by following the procedures outlined for NF$_4$BF$_4$ in our co-pending application Ser. No. 731,198 filed Oct. 12, 1976, and now U.S. Pat. No. 4,107,275.

Another NF$_4^+$ salt derived from SnF$_4$ was obtained by the following quantitative displacement reaction in anhydrous HF as a solvent.

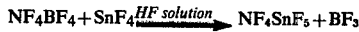

For TiF$_4$, the direct synthesis of an NF$_4^+$ salt from NF$_3$, F$_2$, and TiF$_4$ is still possible, since TiF$_4$ possesses already some vapor pressure at temperatures where NF$_4^+$ salts can be formed. However, the product thus obtained is very rich in TiF$_4$, as shown by the following equation:

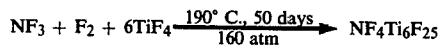

The NF$_4^+$ content of this salt could not be significantly increased by any changes in the reaction conditions.

Displacement reactions between NF$_4$BF$_4$ and TiF$_4$, either in HF solution or in the absence of a solvent, produced NF$_4^+$ salts according to

where, depending on the exact reaction conditions, n equals either 3 or 2.

A further increase in the NF$_4^+$ content was possible by the following metathetical reaction which yielded (NF$_4$)$_2$TiF$_6$:

The separation and purification procedure for this product is analogous to that outlined above for (NF$_4$)$_2$SnF$_6$.

The advantages of the above disclosed concept of using these novel self-clinkering NF$_4^+$ composition for NF$_3$-F$_2$ gas generators become obvious from a comparison of their theoretical performance data. In Table I, the theoretical yields of usable fluorine, expressed in weight percent, of (NF$_4$)$_2$SnF$_6$ and (NF$_4$)$_2$TiF$_6$ are compared to that of KF clinkered NF$_4$BF$_4$, the highest performing presently known system. The novel self-clinkering compositions clearly outperform KF clinkered NF$_4$BF$_4$. Furthermore, the risk of incomplete clinkering which always exists for a clinkered formulation is avoided.

TABLE I

A Comparison of the Theoretical Performance of Self-clinkering (NF$_4$)$_2$SnF$_6$ and (NF$_4$)$_2$TiF$_6$ with KF-clinkered NF$_4$BF$_4$

| System | Performance (Weight % Usable F) |
|---|---|
| NF$_4$BF$_4$ . 1.2KF | 38.5 |
| (NF$_4$)$_2$SnF$_6$ | 46.0 |
| (NF$_4$)$_2$TiF$_6$ | 55.6 |

Accordingly, it is an object of the present invention to provide higher performing solid propellant NF$_3$-F$_2$ gas generator compositions.

Another object of the present invention is to provide self-clinkering NF$_4$+ compositions capable of generating Lewis acid free NF$_3$ and F$_2$.

Another object of the present invention is to provide processes for the production of self-clinkering NF$_4$+ compositions.

These and other objects and features of the present invention will be apparent from the following examples. It is understood, however, that these examples are merely illustrative of the invention and should not be considered as limiting the invention in any sense.

DETAILED DESCRIPTION OF THE INVENTION

EXAMPLE I

Metathetical reactions were carried out in an apparatus consisting of three Teflon FEP U-traps interconnected by Monel unions and closed off at each end by a Monel valve. The union between trap II and trap III contained a Teflon filter and was held in place by a press fit. The passivated apparatus was taken to the dry box and Cs$_2$SnF$_6$ and NF$_4$SbF$_6$ (in a 1:2 mole ratio) were placed into traps I and II, respectively. The apparatus was connected to the vacuum line through flexible corrugated Teflon FEP tubing. Anhydrous HF, in an amount sufficient to just dissolve the starting materials, was added to traps I and II. Trap I was flexed to allow the Cs$_2$SnF$_6$ solution to run into trap II containing the NF$_4$SbF$_6$ solution. Upon contact of the two solutions, copious amounts of a white precipitate (CsSbF$_6$) formed. The contents of trap II were agitated for several minutes to obtain good mixing. Then the apparatus was inverted to allow the solution to run onto the filter. To generate a pressure differential across the filter, trap III was cooled to −80° C. After completion of the filtration step, trap III was warmed to ambient temperature and the HF solvent was pumped off. The solid residue on top of the filter consisted mainly of CsSbF$_6$, whereas the solid collected in trap III was mainly the desired (NF$_4$)$_2$SnF$_6$.

The following example gives a typical product distribution obtainable with the above procedure and apparatus. Starting materials: NF$_4$SbF$_6$ (9.72 mmol), Cs$_2$SnF$_6$ (4.86 mmol); weight of solid on filter=4.24 g; weight of solid in trap III=1.36 g (weight calcd for 4.86 mmol of (NF$_4$)$_2$SnF$_6$=2.01 g). Elemental analysis for solid from trap III. Found: NF$_3$, 31.5; Sn, 25.1; Sb, 5.9; Cs, 1.3. Calculated analysis for a mixture (mol %) of 82.8 (NF$_4$)$_2$SnF$_6$, 12.9 NF$_4$SbF$_6$, and 4.3 CsSbF$_6$: NF$_3$, 31.72; Sn, 24.60; Sb, 5.24; Cs, 1.43.

(NF$_4$)$_2$SnF$_6$ is a white, crystalline, hygroscopic solid, stable at room temperature but decomposing at 240° C. Its characteristic x-ray powder pattern is listed in Table II. Its ionic composition, i. e. the presence of discrete NF$_4$+ cations and SnF$_6$−− anions was established by $^{19}$F nmr, infrared and Raman spectroscopy.

The $^{19}$F nmr spectrum, recorded for a BrF$_5$ solution, showed in addition to the solvent lines a triplet of equal intensity with $\phi=-220$, $J_{NF}=229.6$ Hz, and a line width at half height of about 5 Hz, which is characteristic of tetrahedral NF$_4$+. In addition, a narrow singlet at $\phi=149$ was observed with the appropriate 117/119Sn satellites (average $J_{SnF}=$ 1549 Hz), characteristic of octahedral SnF$_6$−−. The vibrational spectra of (NF$_4$)$_2$SnF$_6$ and their assignments are summarized in Table III.

EXAMPLE II

A mixture of NF$_4$BF$_4$ and SnF$_4$ (9.82 mmol each) was placed into a passivated Teflon-FEP ampoule containing a Teflon coated magnetic stirring bar. Anhydrous HF (10 ml liquid) was added at −78° C., and the resulting suspension was stirred at 25° C. for 2 hours. The volatile material was pumped off at 35° C. leaving behind a white stable solid which, on the basis of its weight (3.094 g) and Raman spectrum, consisted of 83 mol percent NF$_4$SnF$_5$ and 17 mol percent unreacted starting materials. The HF treatment was repeated (again for 2 hours) and the non-volatile residue (2.980 g, weight calcd for 9.82 mmol of NF$_4$SnF$_5$=2.982 g) was shown by infrared, Raman, and $^{19}$F nmr spectroscopy to be essentially pure NF$_4$SnF$_5$. Anal. Calcd for NF$_4$SnF$_5$: NF$_3$, 23.38; Sn, 39.08. Found: NF$_3$, 23.6; Sn, 38.7.

TABLE II

X-RAY POWDER DATE FOR (NF$_4$)$_2$SnF$_6$[a]

| d obsd | d calcd | Int | h k l |
|---|---|---|---|
| 6.27 | 6.36 | w | 1 1 1 |
| 5.67 | 5.70 | vs | 0 0 2 |
| 4.99 | 5.04 | vw | 1 0 2 |
| 3.67 | 3.69 | w | 2 1 2 |
| 3.55 | 3.59 | s | 1 0 3 |
| 3.42 | 3.42 | s | 3 1 0 |
| 2.990 | 2.990 | s | 2 1 3 |
| 2.851 | 2.851 | ms | 0 0 4 |
| 2.492 | 2.490 | m | 3 3 1 |
| 2.347 | 2.356 | w | 3 2 3 |
| 2.230 | 2.228 | s | 4 2 2 |
| 2.120 | 2.123 | mw | 5 1 0 |
| 2.023 | 2.024 | mw | 5 0 2 |
| 1.961 | 1.963 | w | 4 0 4 |
| 1.917 | 1.914 | m | 4 4 0 |
| 1.882 | 1.881 | mw | 5 0 3 |
| 1.834 | 1.832 | w | 5 3 1 |
| 1.813 | 1.814 | mw | 4 4 2 |
| 1.763 | 1.765 | vw | 5 3 2 |
| 1.712 | 1.712 | w | 6 2 0 |
| 1.686 | 1.686 | m | 5 4 0, 3 0 6 |
| 1.662 | 1.662 | m | 3 1 6 |
| 1.616 | 1.614 | mw | 6 3 0 |
| 1.570 | 1.570 | mw | 5 0 5 |
| 1.500 | 1.501 | mw | 6 4 0 |
| 1.397 | 1.396 | mw | 6 4 3 |
| 1.387 | 1.386 | w | 6 5 0 |
| 1.359 | 1.359 | mw | 7 0 6, 5 4 5 |
| 1.331 | | mw | |
| 1.314 | | mw | |
| 1.263 | | w | |
| 1.231 | | w | |
| 1.212 | | mw | |
| 1.192 | | w | |
| 1.177 | | mw | |

[a]tetragonal, a = 10.828A, c = 11.406A, Cu K$_\alpha$ radiation Ni filter

TABLE III

VIBRATIONAL SPECTRA OF SOLID $(NF_4)_2SnF_6$

| Obsd Freq (cm$^{-1}$) and Rel Inten | | Assignments (Point Group) | |
|---|---|---|---|
| IR | Raman | $NF_4^+$ ($T_d$) | $SnF_6^{--}$ ($O_h$) |
| 1224 mw | | $2\nu_4(A_1 + E + F_2)$ | |
| 1160 vs. | 1158 (1.5) | $\nu_3$ ($F_2$) | |
| 1132 sh,vw | | | $\nu_1 + \nu_3$ ($F_{1u}$) |
| 1059 vw | | $\nu_2 + \nu_4$ ($F_1 + F_2$) | |
| 1026 vw | | | $\nu_2 + \nu_3$ ($F_{1u} + F_{2u}$) |
| | 881 (0.1) | $2\nu_2(A_1 + A_2 + E)$ | |
| 854 vvw | 853 (10) | $\nu_1$ ($A_1$) | |
| 613 mw | 613 (5.0) | | |
| 605 mw | 607 (1.5) | $\nu_4$ ($F_2$) | |
| | 579 (8.3) | | $\nu_1$ ($A_{1g}$) |
| 550 vs | | | $\nu_3$ ($F_{1u}$) |
| | 470 (0+) br | | $\nu_2$ ($E_g$) |
| | 449 (3.1) | | |
| | 442 (2.9) | $\nu_2$ (E) | |
| | 251 (3.3) | | $\nu_5$ ($F_{2g}$) |
| | 84 (0.3) | Lattice Vibration | |

$NF_4SnF_5$ is a white, crystalline, hygroscopy solid, stable at room temperature and decomposing above 200° C. Its characteristic x-ray powder pattern is listed in Table IV.

TABLE IV

X-RAY POWDER DATA FOR $NF_4SnF_5$

| d obsd | Int | d obsd | Int |
|---|---|---|---|
| 7.72 | mw | 2.571 | mw |
| 6.32 | vs | 2.519 | vw |
| 5.69 | w | 2.276 | w |
| 5.29 | w | 2.146 | w |
| 4.51 | m | 2.064 | ms |
| 4.19 | m | 1.965 | mw |
| 3.80 | vs | 1.929 | w |
| 3.46 | m | 1.820 | m |
| 3.32 | m | 1.780 | mw |
| 3.17 | mw | 1.757 | mw |
| 2.868 | w | 1.732 | mw |
| 2.802 | w | 1.700 | mw |
| 2.743 | m | 1.661 | vw |
| 2.683 | w | 1.639 | w |
| | | 1.615 | w | its ionic structure, i.e., presence of $NF_4^+$ cations, was established by its $^{19}F$ nmr spectrum in $BrF_5$ solution. In addition to the solvent lines, it showed the triplet (see above) at $\phi = -220$, characteristic of $NF_4^+$. Two resonances were observed for $SnF_5^-$ at $\phi = 145.4$ and 162.4, respectively, with an area ratio of 1:4. At $-20°$ C. the resonances consisted of broad lines, but at lower temperatures the $\phi = 162.4$ signal showed splittings. Based on a more detailed analysis of these data, the $SnF_5^-$ anion appears to have a diameric or polymeric structure. The vibrational spectrum of $NF_4SnF_5$ is listed in Table V and again establishes the presence of discrete $NF_4^+$ cations.

EXAMPLE III

When a mixture of $NF_4BF_4$ and $SnF_4$ in a mol ratio of 2:1 was treated 8 times, as described in Example II, with liquid HF for a total of 35 days, the resulting nonvolatile residue consisted mainly of $NF_4SnF_5$, unreacted $NF_4BF_4$, and only a small amount of $(NF_4)_2SnF_6$.

EXAMPLE IV

The metathetical synthesis of $(NF_4)_2TiF_6$ from saturated HF solutions of $NF_4SbF_6$ (10.00 mmol) and $Cs_2TiF_6$ (5.00 mmol) was carried out in the apparatus described in Example I for the synthesis of $(NF_4)_2SnF_6$. After combination of the solutions of the two starting materials at room temperature and formation of a $CsSbF_6$ precipitate, the mixture was cooled to $-78°$ C. and filtered. The volatile materials were pumped off at 50° C. for 1 hour. The filter cake (3.85 g) was shown by its x-ray powder diffraction pattern and vibrational spectroscopy to be mainly $CsSbF_6$ containing, due to the hold up of some mother liquor, a small amount of $(NF_4)_2TiF_6$. The filtrate residue (1.55 g, weight calcd for 5 mmol of $(NF_4)_2TiF_6 = 1.71$ g) had the composition (mol%): 88.5 $(NF_4)_2TiF_6$ and 11.5 $CsSbF_6$. Found: $NF_3$, 36.2; Ti, 12.21; Sb, 4.11; Cs, 4.4. Calcd for a mixture of 88.5 $(NF_4)_2TiF_6$ and 11.5 $CsSbF_6$: $NF_3$, 36.43; Ti, 12.29; Sb, 4.06; Cs, 4.43. Based on the observed Raman spectrum, the composition of the filtrate residue was estimated to be 90 $(NF_4)_2TiF_6$ and 10 $CsSbF_6$, in good agreement with the above elemental analysis.

$(NF_4)_2TiF_6$ is a white, crystalline, hygroscopic solid, stable at room temperature, but decomposing above 200° C. Its characteristic x-ray powder pattern is listed in Table VI.

TABLE V

VIBRATIONAL SPECTRA OF SOLID $NF_4SnF_5$

| Obsd Freq (cm$^{-1}$) and Rel Intens $NF_4SnF_5$ | | Assignments (Point Group) |
|---|---|---|
| IR | Raman | $NF_4^+$ ($T_d$) |
| 1222 mw | | $2\nu_4$ ($A_1 + E + F_2$) |
| 1165 vs | 1168 (0.4) | |
| | 1159 (0.8) | $\nu_3$ ($F_2$) |
| | 1150 sh | |
| 1134 w,sh | | |
| 1061 w | | |
| 1048 w | | $\nu_2 + \nu_4$ ($F_1 + F_2$) |
| | 811 (0.2) | $2\nu_2$ ($A_1 + A_2 + E$) |
| 850 wv | 851 (10) | $\nu_1$ ($A_1$) |
| 635 vs | | |
| | 622 (9.2) | |
| 605 mw | 606 (3.3) | $\nu_4$ ($F_2$) |
| 575 vs | | |
| | 574 (0.5) | |
| 559 w, sh | 558 (2.0) | |
| 490 m | 490 (0+) | |
| 458 m | | |
| | 448 (2.5) | |
| | 440 (2.3) | $\nu_2$ (E) |
| | 272 (0.6) | |
| | 247 (1.4) | |
| | 222 (1.1) | |
| | 197 (0.6) | |
| | 154 (0+) | |
| | 135 (0.2) | |

TABLE VI

X-RAY POWDER DATE FOR $(NF_4)_2TiF_6{}^a$

| d obsd | d calcd | Int | h k l |
|---|---|---|---|
| 6.23 | 6.26 | vw | 1 1 1 |
| 5.57 | 5.56 | vs | 0 0 2 |
| 4.93 | 4.93 | w | 1 0 2 |
| 3.49 | 3.50 | s | 1 0 3 |
| 3.39 | 3.39 | s | 3 1 0 |
| 2.94 | 2.93 | ms | 2 1 3 |
| 2.782 | 2.778 | m | 0 0 4 |

TABLE VI-continued

| X-RAY POWDER DATE FOR $(NF_4)_2TiF_6$[a] | | | |
|---|---|---|---|
| d obsd | d calcd | Int | h k l |
| 2.465 | 2.463 | w | 3 3 1 |
| 2.315 | 2.318 | mw | 3 2 3 |
| 2.201 | 2.200 | s | 4 2 2 |
| 2.100 | 2.101 | w | 5 1 0 |
| 1.990 | 1.990 | vw | 5 2 0, 5 0 2 |
| 1.892 | 1.894 | m | 4 4 0 |
| 1.789 | 1.789 | mw | 6 0 0, 4 4 2 |
| 1.663 | 1.664 | mw | 2 2 6 |
| 1.641 | 1.644 | mw | 3 0 6 |

[a]tetragonal, a = 10.715A, c = 11.114A, Cu Kα radiation Ni filter

Its ionic structure, i.e. the presence of discrete $NF_4^+$ cations and $TiF_6^{--}$ anions was established by $^{19}F$ nmr and vibrational spectroscopy. The $^{19}F$ nmr spectrum showed the triplet at $\phi = -220$, characteristic for $NF_4^+$ as shown above, and the characteristic $TiF_6^{--}$ signal at $\phi = -81.7$. The vibrational spectra are listed in Table VII.

TABLE VII

| VIBRATIONAL SPECTRA OF SOLID $(NF_4)_2TiF_6$ | | | |
|---|---|---|---|
| Obsd Freq (cm$^{-1}$) and Rel Intens | | Assignments (Point Group) | |
| IR | Raman | $NF_4^+(T_d)$ | $TiF_6^{--}(O_h)$ |
| 1219 mw | | $2\nu_4(A_1 + E + F_2)$ | |
| 1160 vs | 1158 (1.4) | | |
| 1132 sh,vw | | $\nu_3(F_2)$ | |
| 1060 vw | | $\nu_2 + \nu_4(F_1 + F_2)$ | |
| 1021 w | | | |
| 910 vw | | | $\nu_1 + \nu_4(F_{1u})$ |
| | 883 (0.1) | $2\nu_2(A_1 + A_2 + E)$ | |
| 850 sh,vw | 853 (10) | $\nu_1(A_1)$ | |
| 804 w | | | |
| 611 mw | 612 (5) | $\nu_4(F_2)$ | |
| | 607 sh | | |
| | 601 (8.0) | | $\nu_1(A_{1g})$ |
| 563 vs | | | $\nu_3(F_{1u})$ |
| 452 vw | 450 (3.3) | | |
| | 442 (2.6) | $\nu_2(E)$ | |
| | 289 (8,2) | | $\nu_5(F_{2g})$ |
| | 107 (0+) | | |
| | 86 (2) | Lattice Vibrations | |

EXAMPLE V $TiF_4$ (11.3 mmol), $NF_3$ (200 mmol), and $F_2$ (200 mmol) were heated in a passivated 90 ml Monel cylinder to various temperatures for different time periods. After each heating cycle, the volatile products were temporarily removed and the progress of the reaction was followed by determining the weight gain of the solid and recording its vibrational spectra. Heating to 200° C. for 3 days resulted in a weight gain of 8 mg and the vibrational spectra showed mainly unreacted $TiF_4$ in addition to a small amount of $NF_4^+$ and a polyperfluorotitanate (IV) anion (probably $Ti_6F_{25}^-$) having its strongest Raman line at 784 cm$^{-1}$. During the next two heating cycles (190°-195° C. for 14 days and 180° C. for 35 days) the solid gained 149 and 41 mg, respectively, in weight. The vibrational spectra did not show any evidence of unreacted $TiF_4$, and the relative intensities of the bands due to $NF_4^+$ had significantly increased. Furthermore, the 784 cm$^{-1}$ Raman line had become by far the most intense Raman line. Additional heating to 230° C. for 3 days did not result in significant changes in either the weight or the vibrational spectra of the solid. Based on the observed weight increase and on the lack of spectroscopic evidence for the presence of lower polyperfluorotitanate (IV) anions, the solid product appears to have the approximate composition $NF_4Ti_6F_{25}$ (calcd weight increase, 205 mg; obsd weight increase 198 mg).

EXAMPLE VI

Displacement reactions were carried out either in HF solution at room temperature or by heating the starting materials in the absence of a solvent in a Monel cylinder. For the HF solution reactions, the solid starting materials (6 mmol of $NF_4BF_4$ in each experiment) were placed in a passivated Teflon FEP ampoule and 15 ml of liquid anhydrous HF was added. The mixture was stirred with a Teflon coated magnetic stirring bar at room temperature for a given time period. The volatile products were pumped off at 50° C. for 3 hours and the composition of the solid residue was determined by elemental and spectroscopic analyses and from the observed material balances.

The thermal displacement reactions were carried out in a prepassivated 90 ml Monel cylinder which was heated in an electric oven for a specified time period. The volatile products were separated by fractional condensation in a vacuum line, measured by PVT, and identified by infrared spectroscopy. The solid residues were weighed and characterized by elemental and spectroscopic analyses. The results of these experiments are summarized in Table VIII.

TABLE VIII

| Results from the Displacement Reactions between $NF_4BF_4$ and $TiF_4$ | | |
|---|---|---|
| Reactants (mol) | Reaction Conditions | Products (mol) |
| $NF_4BF_4(6)$, untreated $TiF_4(6)$ | HF, 24° C., 18h | $NF_4Ti_2F_9(4)$, $NF_4BF_4(4)$ |
| $NF_4BF_4(6)$, untreated $TiF_4(12)$ | HF, 24° C., 72h | $NF_4Ti_2F_9(6)$ |
| $NF_4BF_4(6)$, prefluor. $TiF_4(6)$ | HF, 24° C., 138h | $HF_4Ti_3F_{13}(\sim 2)$, $NF_4BF_4(\sim 4)$, small amount of $NF_4Ti_2F_9$ |
| $NF_4BF_4(6)$, prefluor. $TiF_4(12)$ | HF, 24° C., 96h | $NF_4Ti_3F_{13}(4)$, $NF_4BF_4(2)$, |
| $NF_4BF_4(6)$, untreated $TiF_4(6)$ | 190° C., 18h | $NF_4Ti_2F_9(\sim 3)$, $NF_3(\sim 3)$, $BF_3(\sim 6)$, small amounts of $NF_4BF_4$ and $NF_4Ti_3F_{13}$ |
| $NF_4BF_4(6)$, untreated $TiF_4(6)$ | 160° C., 60h | $NF_4Ti_3F_{13}(2)$, $NF_4BF_4(1.4)$, $NF_3(2.6)$, $BF_3(4.6)$ |
| $NF_4BF_4(6)$, prefluor. $TiF_4(6)$ | 170° C., 20h | $NF_4Ti_2F_9(3)$, $NF_4BF_4(3)$, $BF_3(3)$ |
| $NF_4BF_4(6)$, prefluor. $TiF_4(12)$ | 170° C., 20h | $NF_4Ti_2F_9(3.6)$, $NF_4Ti_3F_{13}(1.6)$, $BF_3(5.4)$, $NF_4BF_4(0.6)$ |
| $NF_4BF_4(6)$, prefluor. $TiF_4(12)$ | 170° C., 192h | $NF_4Ti_2F_9(6)$, $BF_3(6)$ |

Obviously, numerous variations and modifications may be made without departing from the present invention. Accordingly, it should be clearly understood that the forms of the present invention described above are illustrative only and are not intended to limit the scope of the present invention.

We claim:

1. A compound for use in an improved $NF_3$—$F_2$ gas generator, said compound having the general composition $(NF_4^+)_n A^{n-}$, wherein $A^{n-}$ is derived from $TiF_4$ and is self-clinkering.

2. A compound for use in an improved $NF_3$—$F_2$ gas generator, said compound having the general composition $(NF_4^+)_n A^{n-}$, wherein $A^{n-}$ is $TiF_6^{--}$ and is self-clinkering.

3. A compound for use in an improved $NF_3$—$F_2$ gas generator, said compound having the general composition $(NF_4^+)_n A^{n-}$, wherein $A^{n-}$ is $Ti_2F_9^-$ and is self-clinkering.

4. A compound for use in an improved $NF_3$—$F_2$ gas generator, said compound having the general composition $(NF_4^+)_n A^{n-}$, wherein $A^{n-}$ is $Ti_3F_{13}^-$ and is self-clinkering.

5. A compound for use in an improved $NF_3$-$F_2$ gas generator, said compound having the general composition $(NF_4)_n^+ A^{n-}$, wherein $A^{n-}$ is $Ti_6F_{25}^-$ and is self-clinkering.

6. A process for the production of $NF_4^+ TiF_5^- \cdot nTiF_4$, comprising the steps of treating $NF_4BF_4$ with $TiF_4$ in anhydrous HF solution at room temperature.

7. A process for the production of $NF_4^+ TiF_5^- \cdot nTiF_4$, comprising the step of treating $NF_4BF_4$ with $TiF_4$ at temperatures ranging from 150° to 200° C.

8. A process for the production of $NF_4Ti_6F_{25}$, comprising the step of heating a mixture of $NF_3$, $F_2$ and $TiF_4$ to 170° C. to 200° C. at elevated pressure.

* * * * *

UNITED STATES PATENT AND TRADEMARK OFFICE
CERTIFICATE OF CORRECTION

PATENT NO. : 4,152,406
DATED : May 1, 1979
INVENTOR(S) : Karl O. Christe et al

It is certified that error appears in the above-identified patent and that said Letters Patent are hereby corrected as shown below:

Column 2, line 2, delete "$NF_4^{30}$" and insert --$NF_4^+$--;
       line 6, delete "eevidence" and insert --evidence--.

Column 4, line 14, delete "117/119Sn" and insert --$^{117/119}Sn$--.

Column 5, line 7, delete "$2\nu_4(A_1^6 + E + F2)$" and insert --$2\nu_4(A_1+E+F_2)$--.

Column 8, Table VIII, line 6, delete "$NF_4TI_2F_9$" and insert --$NF_4Ti_2F_9$--.

Column 10, Line 3, delete "$(NF_4)_n+A^{n-}$" and insert --$(NF_4^+)_nA^{n-}$--.

Signed and Sealed this

*Fourteenth* Day of *August 1979*

[SEAL]

*Attest:*

LUTRELLE F. PARKER
*Attesting Officer*      *Acting Commissioner of Patents and Trademarks*